(12) United States Patent
Hoareau et al.

(10) Patent No.: US 9,075,872 B2
(45) Date of Patent: Jul. 7, 2015

(54) CONTENT-BASED NAVIGATION FOR ELECTRONIC DEVICES

(75) Inventors: Guillaume Hoareau, Montpellier (FR); Althea Hookens, Melbourne (AU); John Musial, Newburgh, NY (US); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 13/455,535

(22) Filed: Apr. 25, 2012

(65) Prior Publication Data

US 2013/0290299 A1 Oct. 31, 2013

(51) Int. Cl.
*G06F 17/30* (2006.01)

(52) U.S. Cl.
CPC .... *G06F 17/30722* (2013.01); *G06F 17/30554* (2013.01); *G06F 17/30424* (2013.01); *G06F 17/30386* (2013.01); *G06F 17/30011* (2013.01); *G06F 17/30861* (2013.01)

(58) Field of Classification Search
CPC ............ G06F 17/30554; G06F 17/30011; G06F 17/30424; G06F 17/30861; G06F 17/241; G06F 17/30386; G06F 17/30979; G06F 17/30696; G06F 17/30876
USPC ................ 707/708, 722, 736, 741
See application file for complete search history.

(56) References Cited

U.S. PATENT DOCUMENTS

| | | | |
|---|---|---|---|
| 8,346,620 B2 * | 1/2013 | King et al. ............ | 705/26.1 |
| 2002/0082939 A1 | 6/2002 | Clark et al. | |
| 2004/0268253 A1 | 12/2004 | DeMello et al. | |
| 2008/0165255 A1 | 7/2008 | Christie et al. | |
| 2008/0293450 A1 | 11/2008 | Ryan et al. | |
| 2008/0294674 A1 * | 11/2008 | Reztlaff et al. ............ | 707/102 |
| 2009/0199082 A1 * | 8/2009 | Hollander et al. ........... | 715/230 |
| 2009/0204882 A1 * | 8/2009 | Hollander et al. ........... | 715/230 |
| 2009/0265627 A1 | 10/2009 | Kim et al. | |
| 2010/0004944 A1 | 1/2010 | Palaniappan | |
| 2010/0175018 A1 | 7/2010 | Petschnigg et al. | |
| 2011/0047495 A1 | 2/2011 | Hendricks | |
| 2011/0050593 A1 | 3/2011 | Kim et al. | |
| 2012/0072228 A1 * | 3/2012 | Pankajakshan et al. ....... | 705/1.1 |
| 2012/0078633 A1 * | 3/2012 | Fume et al. .................. | 704/260 |
| 2012/0166754 A1 * | 6/2012 | Sidman ........................ | 711/170 |
| 2012/0173353 A1 * | 7/2012 | Rausch et al. ............... | 705/26.1 |

(Continued)

OTHER PUBLICATIONS

Allen, "Weaving Content with Coordination Widgets", D-lib magazine, vol. 17, No. 11/12 , [Retrieved Nov. 21, 2011 www.dlib.org/dlib/november11/allen/11allen.html]; pp. 1-7 (2011).

(Continued)

*Primary Examiner* — Dung K Chau
(74) *Attorney, Agent, or Firm* — Cantor Colburn LLP

(57) ABSTRACT

Content-based navigation of an electronic device includes receiving supplemental content to an electronic book. The supplemental content is created separately from the electronic book. The content-based navigation also includes associating an identifier of the electronic book with the supplemental content, storing the supplemental content with the identifier in a storage device, and creating an index to the supplemental content that is searchable by the identifier of the electronic book. The content-based navigation further includes providing end user devices with access to the supplemental content in the storage device via the index.

11 Claims, 9 Drawing Sheets

(56) References Cited

U.S. PATENT DOCUMENTS

2012/0233539 A1* 9/2012 Reed .............................. 715/234
2012/0311438 A1* 12/2012 Cranfill et al. ................. 715/256

OTHER PUBLICATIONS

Kim et al., "Social Navigation and Annotation for Electronic Books", Proceeding of the 2008 ACM workshop on Research advances in large digital book repositories; pp. 25-28, (2008).

P. Mell, T. Grace, "The NIST Definition of Cloud Computing" (Draft)—Recommendations of the National Institute of Standards and Technology, pp. 1-7 (Jan. 2011).

Adobe Digital Editions FAQ, "What are the Digital Editions annotation capabilities?" [Retrieved Apr. 24, 2012, http://www.adobe.com/products/digitaleditions/faq/] pp. 1-9.

International Search Report of the International Searching Authority, PCT/US13/25675, date of mailing Apr. 19, 2013, 10 pages.

Written Opinion of the International Searching Authority, PCT/US13/25675, date of mailing Apr. 29, 2013, 4 pages.

Final Office Action for U.S. Appl. No. 13/566,190, mailed Sep. 12, 2013, 12 pages.

Non Final Office Action for U.S. Appl. No. 13/566,190, mailed Mar. 29, 2013, 15 pages.

U.S. Appl. No. 13/566,190; Non Final Office Action; filed Aug. 3, 2012; Date Mailing: Jun. 19, 2014; 15 pages.

* cited by examiner

700

| E-BOOK IDENTIFIER 702 | CONTRIBUTOR IDENTIFICATION 704 | LOCATION IDENTIFIER 706 | SUPPL CONTENT CLASSIFICATION 708 | CONTENT 710 |
|---|---|---|---|---|
| | | | | |

CONTENT-BASED NAVIGATION FOR ELECTRONIC DEVICES

BACKGROUND

The present invention relates to electronic data and, more particularly, to content-based navigation for electronic devices.

Many of today's electronic devices, such as electronic readers (e-readers), personal computers, tablet PCs, and smart phones include functionality for downloading electronic content (e.g., electronic books, magazines, or newspapers). Current navigation options for electronic devices that store the e-books or similar types of electronic content center around conventions of moving through a book one page at a time or simply providing a listing of page numbers or table of contents within the electronic content and allowing end users to jump to selected page numbers or chapters with little or no information about what the pages contain.

SUMMARY

According to one embodiment of the present invention, a service for implementing a content-based navigation service is provided. The service includes receiving, at a computer processor, supplemental content to an electronic book, the supplemental content created separately from the electronic book. The service also includes associating an identifier of the electronic book with the supplemental content, storing the supplemental content with the identifier in a storage device, and creating, by the computer processor, an index to the supplemental content that is searchable by the identifier of the electronic book. The service further includes providing end user devices with access to the supplemental content in the storage device via the index.

According to further embodiment of the present invention, a system for implementing content-based navigation services is provided. The system includes a computer processor and logic executable by the computer processor. The logic is configured to implement a method. The method includes receiving supplemental content to an electronic book, the supplemental content created separately from the electronic book. The method also includes associating an identifier of the electronic book with the supplemental content, storing the supplemental content with the identifier in a storage device, and creating an index to the supplemental content that is searchable by the identifier of the electronic book. The method further includes providing end user devices with access to the supplemental content in the storage device via the index.

According to yet a further embodiment of the present invention, an electronic device for implementing content-based navigation is provided. The electronic device includes a computer processor and logic executable by the computer processor. The logic is configured to implement a method. The method includes providing a navigation user interface on the electronic device, and identifying, via the navigation user interface, initiation of a navigation event occurring on the electronic device. The electronic device has activated an electronic book. The method also includes searching memory of the electronic device for an identifier of the electronic book. In response to discovering the identifier of the electronic book in the memory, the method includes retrieving objects in the memory associated with the identifier of the electronic book, presenting a selectable list of object categories associated with retrieved objects, and displaying content for a user-selected object from the list on a display of the electronic device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
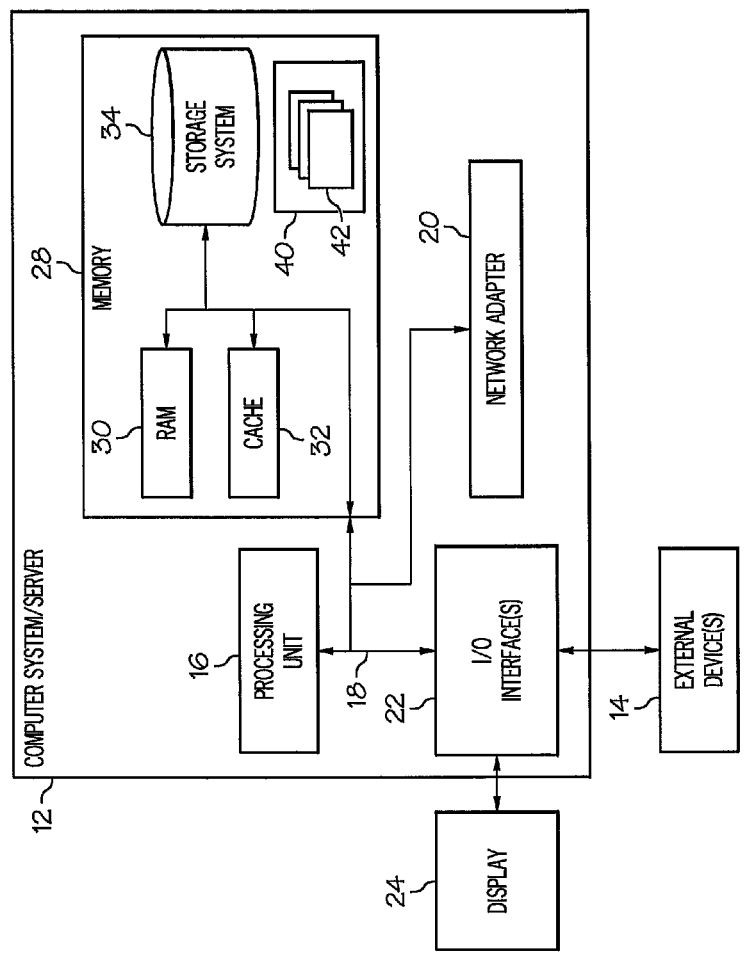
FIG. 1 depicts a cloud computing node according to an embodiment of the present invention.

Exemplary embodiments relate to content-based navigation services, which provide the ability for end users of electronic devices to create and consume content that is supplemental to, and is created and exists separately, from electronic content that has been downloaded to the electronic devices. This content is referred to herein as "supplemental content." The electronic content may include electronic books (e-books), electronic newspapers, magazines, or similar information. The content-based navigation services maintain and/or access one or more repositories of the supplemental content in response to end users' requests. The content-based navigation services provide end users with a navigation user interface that guides the end users through a process for creating the supplemental content, as well as downloading and viewing supplemental content derived from other sources.

It is understood in advance that although this disclosure includes a detailed description on cloud computing, implementation of the teachings recited herein are not limited to a cloud computing environment. Rather, embodiments are capable of being implemented in conjunction with any other type of computing environment now known or later developed (e.g., any client-server model).

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
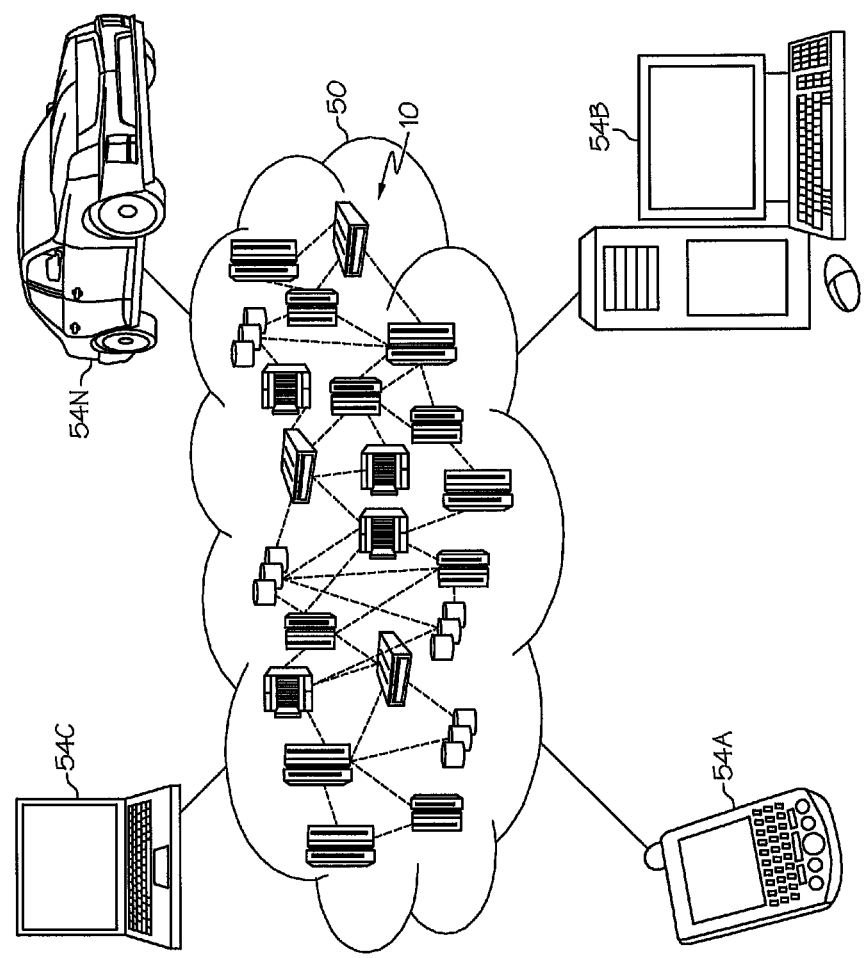
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
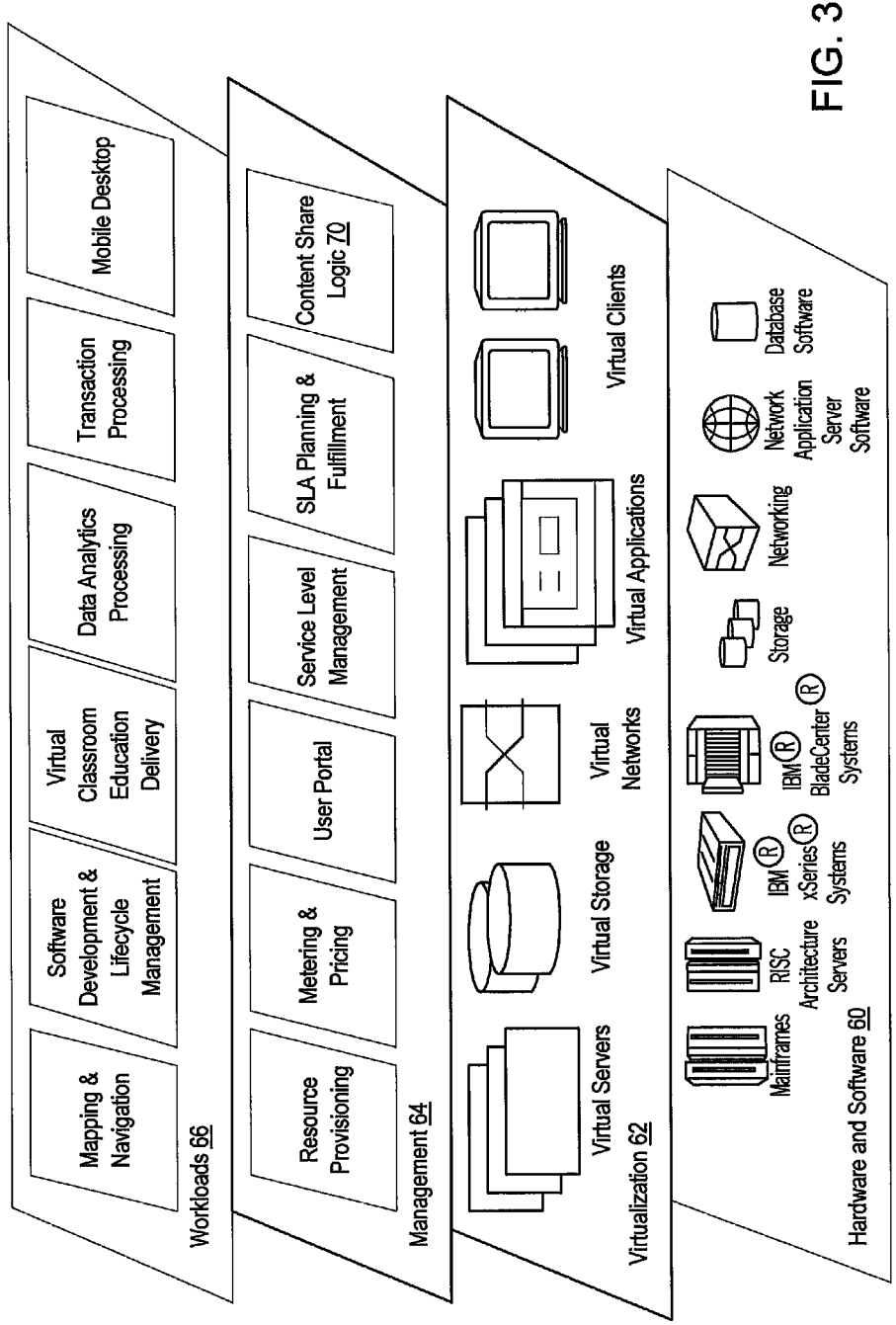
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one embodiment, one or both of the hardware and software layer 60 and the virtualization layer 62 may include edge components, such as a web server front end and multi-dimensional audio contour map cache, as well as a multi-dimensional audio contour map library store, e.g., in a high-performance RAID storage area network (SAN).

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; content share logic 70; transaction processing; and a mobile desktop for mobile devices (e.g., 54A, 54C, and 54N, as well as mobile nodes 10 in cloud computing environment 50) accessing the cloud computing services. In one exemplary embodiment, content share logic 70 in the workloads layer 66 implements at least a portion of the exemplary content-based navigation services described herein; however, it will be understood that the exemplary processes may be implemented in any layer.

The content share logic 70 includes one or more algorithms to implement embodiments described herein to provide content-based navigation services. In an embodiment, the content share logic 70 is coupled to and/or resides in the memory 28 shown in FIG. 1. In addition, embodiments of the content share logic 70 include one or more program modules 42 of the program/utility 40 shown in FIG. 1. In a further embodiment, the content share logic 70 is executed on hardware located in the hardware and software layer 60.

Figure 4:
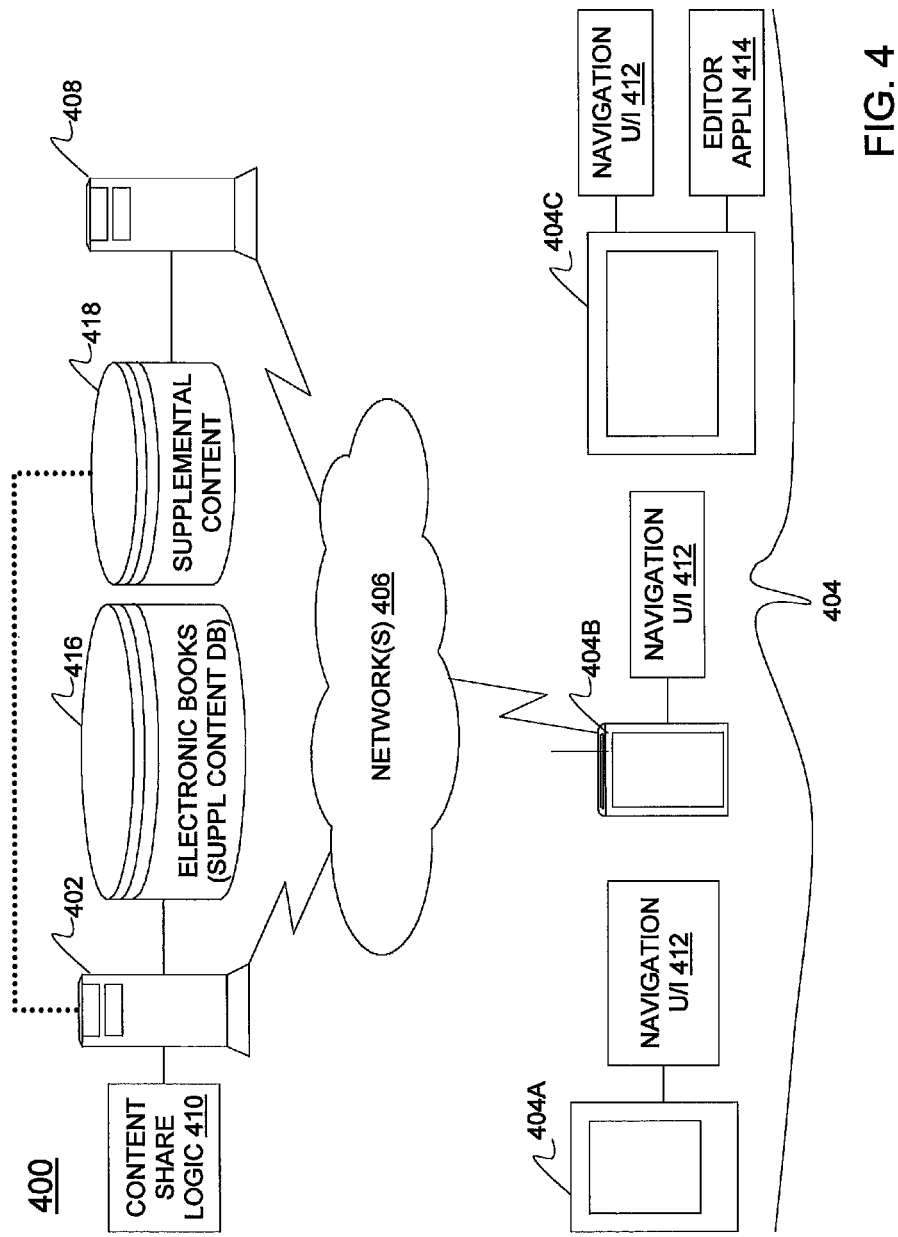
FIG. 4 depicts a block diagram of a system according to an embodiment.

Turning now to FIG. 4, a system 400 upon which content-based navigation services (also referred to herein as "navigation services") may be implemented will now be described. The system 400 of FIG. 4 depicts a host system computer 402 and electronic devices 404 in communication with one or more networks 406.

The host system computer 402 may be implemented as one or more high-speed computer processing devices, such as one or more mainframe computers capable of handling a high volume of computing activities conducted by end users of the exemplary navigation services. The host system computer 402 executes content share logic 410 for implementing at least a portion of the navigation services described herein. The content share logic 410 refers to the content share logic 70 described in FIG. 3. In an alternative embodiment, a portion of the content share logic 410 may reside on an end user system, such as one or more of electronic devices 404. For example, the navigation services include an interface (e.g., navigation interface 412) that is provided to the electronic devices 404 for creating, viewing, and sharing supplemental content, as described herein.

The host system computer 402 may be implemented by a digital content provider, such as an online or virtual book store that receives a variety of electronic content from a multitude of different content publishers, and provides end user devices (e.g., electronic devices 404) with access to the electronic content by download, typically for a small fee. The electronic content is stored by the host system computer 402 in a storage device 416, which is communicatively coupled to the host system computer 402. As shown in FIG. 4 for illustrative purposes, the electronic content refers to electronic books, or e-books; however, it will be understood that other types of electronic content may be serviced by the host system computer 402, such as electronic newspapers and magazines.

A collection server computer 408 is communicatively coupled with the network(s) 406. The collection server computer 408 may be implemented as one or more high-speed computer processing devices, such as mainframe computers capable of processing communications and transactions occurring between them and the host system computer 402 and electronic devices 404. The collection server computer 408 may be a third-party content provider.

The collection server computer 408 receives supplemental content from third parties, such as authors or publishers of the electronic content, and/or end users that create their own supplemental content. As described herein, supplemental content may be any information, data, graphics, etc., that is contextually related to the electronic content (e.g., an electronic book), and may even include organized groupings of elements existing in the electronic content (e.g., a grouping of all images, graphs/diagrams, defined text, etc. contained in the electronic content). Supplemental content may further include an electronic content author's annotations, a third-party entity's annotations of the electronic content authored by another party, and/or an end user's annotations of the electronic content authored by a different party (e.g., an end user who has purchased and downloaded electronic content), which annotations include explanatory comments or critiques of a particular portion of the electronic content.

The supplemental content may be stored by the collection server computer 408 in a storage device 418. As shown in FIG. 4, the host system computer 402 may directly access the supplemental content stored in the storage device 418 or may access the supplemental content through the collection server computer 408. Alternatively, at least a portion of the supplemental content may be stored in a database housed in the storage device 416 by the host system computer 402.

Although shown as two separate systems in FIG. 4, it will be understood that the functionality of the collection server computer 408 may be implemented directly by the host system computer 402, e.g., when the host system computer 402 acts as a collection server to third parties and end users with regard to supplemental content created for use with the electronic content. Alternatively, multiple collection servers may be implemented for collecting supplemental content, whereby the host system computer 402 accesses the collection servers over the network(s) 406 to retrieve the supplemental content.

In an embodiment, an end user of one of the electronic devices 404 creates supplemental content for association with an electronic book. The supplemental content may be implemented as an XML file, which is transmitted to the collection server computer 408 and stored in the storage device 418. Alternatively, the supplemental content may be uploaded to the host system computer 402 and stored in storage device 416. If stored in storage device 418, the host system computer 402 may be given certain access permissions to the supplemental content for dissemination to requesting electronic devices 404.

The storage device 416 may also store links or locations (e.g., URIs) of the collection server computer 408 for use in accessing the supplemental content. It is understood that the storage devices 416 and 418 may be implemented using memory contained in the respective host system computer 402 and collection server computer 408, or may each be a separate physical device, as illustrated in FIG. 4. The storage devices 416 and 418 may be logically addressable as consolidated data sources across a distributed environment that includes one or more networks (e.g., network(s) 406).

The host system computer 402 operates as a database server and coordinates access to information including data stored on the storage device 416 and, optionally, storage device 418. The host system computer 402 and the collection server computer 408 may each be implemented using one or more servers operating in response to a computer program stored in a storage medium accessible by the servers. The host system computer 402 and the collection server computer 408 may each operate as a network server (e.g., a web server) to communicate with the electronic devices 404 and other network entities.

As shown in FIG. 4, electronic devices 404 are provided. Electronic devices 404 may include portable, wireless communication devices, such as smart phones, personal digital assistants, and tablet PCs, or may be wired devices, such as general-purpose computers, laptops, and host-attached terminals. As shown in FIG. 4, for example, the electronic devices 404 include an electronic reader device 404A, a smart phone 404B, and a table PC 404C.

The electronic devices 404 each include processing circuits and I/O interfaces, such as a keyboard, a display device and network interface. The electronic devices 404 can include various computer hardware and software technology known in the art, such as one or more processing units or circuits, volatile and non-volatile memory including removable media, power supplies, network interfaces, support circuitry, operating systems, and the like.

The electronic devices 404 may each execute a web browser (not shown) for accessing network entities, such as the host system computer 402 and the collection server computer 408. In one embodiment, the electronic devices 404 access a web site of the host system computer 402 for browsing and downloading electronic books residing in the storage device 416, as well as supplemental content residing in one or both of the storage device 416 and the storage device 418. One or more of the electronic devices 404 may include an editor application for creating annotations usable by the navigation user interface 412 for facilitating the navigation services described herein. For example, as shown in FIG. 4, electronic device 404C executes an editor application 414 for this purpose.

The network(s) 406 may be any type of known networks including, but not limited to, a wide area network (WAN), a local area network (LAN), a global network (e.g. Internet), a virtual private network (VPN), and an intranet. The network (s) 406 may be implemented using a wireless network or any kind of physical network implementation known in the art, e.g., using cellular, satellite, and/or terrestrial network technologies.

As described above, the exemplary content-based navigation services provide the ability for end users of electronic devices to create and consume content that is supplemental to existing electronic content that has been downloaded to the electronic devices. The content-based navigation services provide end users with a navigation user interface that guides the end users through a process for creating supplemental content, as well as downloading supplemental content derived from other sources.

Figure 5:
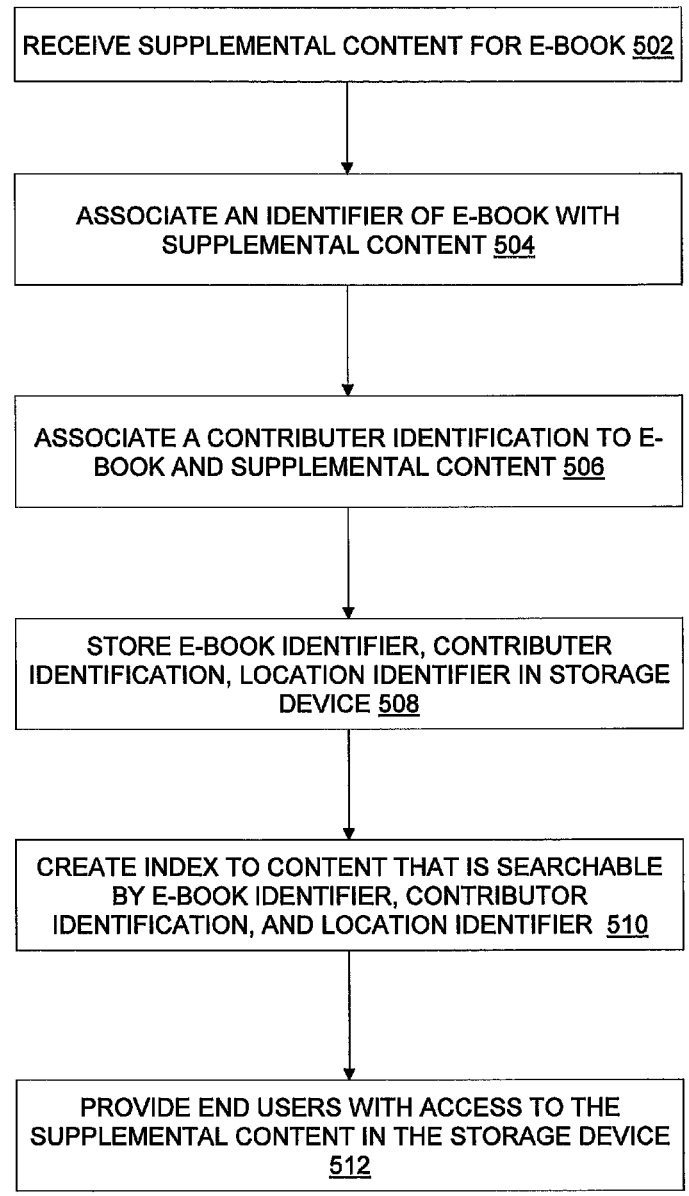
FIG. 5 depicts a flow diagram of a process according to an embodiment.

Turning now to FIG. 5, a process for implementing the navigation services will now be described in an exemplary embodiment. For purposes of illustration, and by way of non-limiting example, the processes described in FIG. 5 assume that electronic content currently existing in the storage device 416 relate to electronic books. It is also assumed that the supplemental content is created and provided by end users of the electronic devices 404 who are not authors of the corresponding electronic books, but rather are end users who have downloaded the respective electronic books to their electronic devices 404. However, it will be understood that other supplemental content may be provided by the authors of the electronic books and/or third-party enterprises who develop supplemental content for electronic content and provide the supplemental content for a fee.

Figures 6, 7:
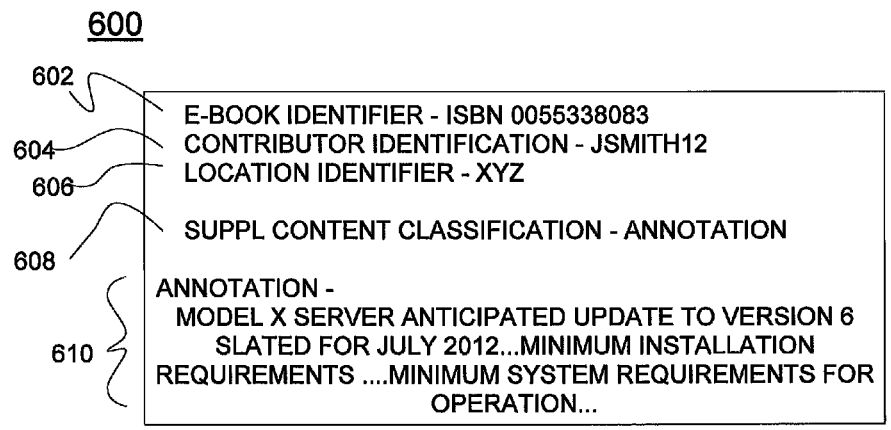
FIG. 6 depicts a file including sample end-user generated content according to an embodiment.
FIG. 7 depicts a data structure according to an embodiment.

At step 502, the host system computer 402 receives content from an electronic device, e.g., one of the electronic devices 404, that is supplemental to an electronic book. A file 600 shown in FIG. 6 illustrates sample supplemental content that may be created by, and received from, an end user. The file 600 may be expressed or implemented, e.g., as an XML file. The file 600 includes an identifier of the electronic book 602, an identification of the contributor of the supplemental content 604, and a location identifier 606. The location identifier specifies a portion of the electronic book to which the supplemental content relates. For example, as shown in FIG. 6, a classification of the supplemental content 608 specifies "Annotation" which means the supplemental content refers to a commentary or critique provided by the end user. The annotation contextually corresponds to a portion of the electronic book. As shown in FIG. 6 for illustrative purposes, the file 600 relates to an electronic book directed to the subject of information technology. The supplemental content 610 refers to an annotation created by the end user specifies "Model X server anticipated update to version 6 slated for July 2012 . . . minimum installation requirements . . . minimum system requirements for operation . . . " Thus, the end user is seeking to inform other readers of the electronic book of an anticipated update to a particular server that is referenced at a particular location in the electronic book, whereby the location is indicated by the location identifier 606. The location may be referenced using any metrics, such as page number of the electronic book or percentage of the overall volume of the electronic book, since many electronic books can be modified in font size which results in a particular portion of the book having varying page numbers that are a function of the end user's selected font size.

At step 504, the content share logic 410 associates an identifier of the electronic book 602 with the supplemental content received from the electronic device 404. The identifier of the electronic book 602 may be an international standard book number (ISBN) assigned to the electronic book, e.g., by a publisher.

At step 506, the content share logic 410 associates the identification of the contributor 604 of the supplemental content to the electronic book and the corresponding supplemental content and also associates the location identifier 606 and content classification 608 for the supplemental content to the electronic book. The classification 608 may be defined and configured via the content share logic 410. As shown in FIG. 7, a sample data structure 700 indicating the association of an electronic book to supplemental content and related information is shown. The data structure 700 includes a field 702 corresponding to the electronic book identifier 602 from file 600, a contributor identification field 704 corresponding to the contributor identification 604 from file 600, a location identifier field 706 corresponding to the location identifier 606 from file 600, a supplemental content classification field 708 corresponding to the content classification 608 from file 600, and a content field 710 corresponding to the supplemental content 610 (e.g., annotation) from file 600.

At step 508, the content share logic 410 stores the identifier of the electronic book 602, the contributor identification 604, the location identifier 606, content classification 608, and the corresponding supplemental content 610 using the corresponding fields 702, 704, 706, 708, and 710 in the data structure 700 in the storage device 416. In an embodiment, if the supplemental content is stored in a third-party storage device, such as storage device 418, the data structure 700 may be modified to include a field (not shown) indicating the source (e.g., URL) of the supplemental content.

At step 510, the content share logic 410 creates an index for the supplemental content that is searchable by the identifier of the electronic book, the contributor identification, and/or the location identifier.

At step 512, the content share logic 410 provides end users with access to the searchable index and corresponding search results of related supplemental content from the storage device 416.

Figure 8:
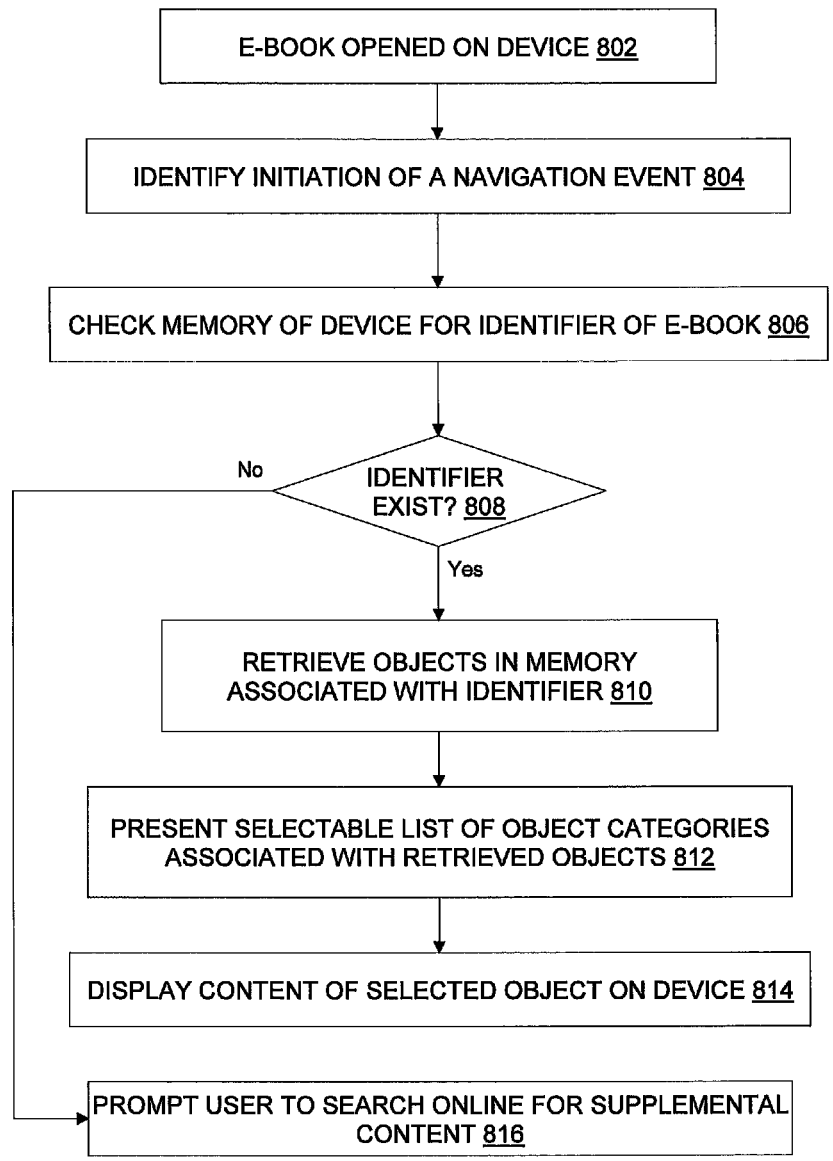
FIG. 8 depicts a flow diagram of a process according to an embodiment.
Figure 9:
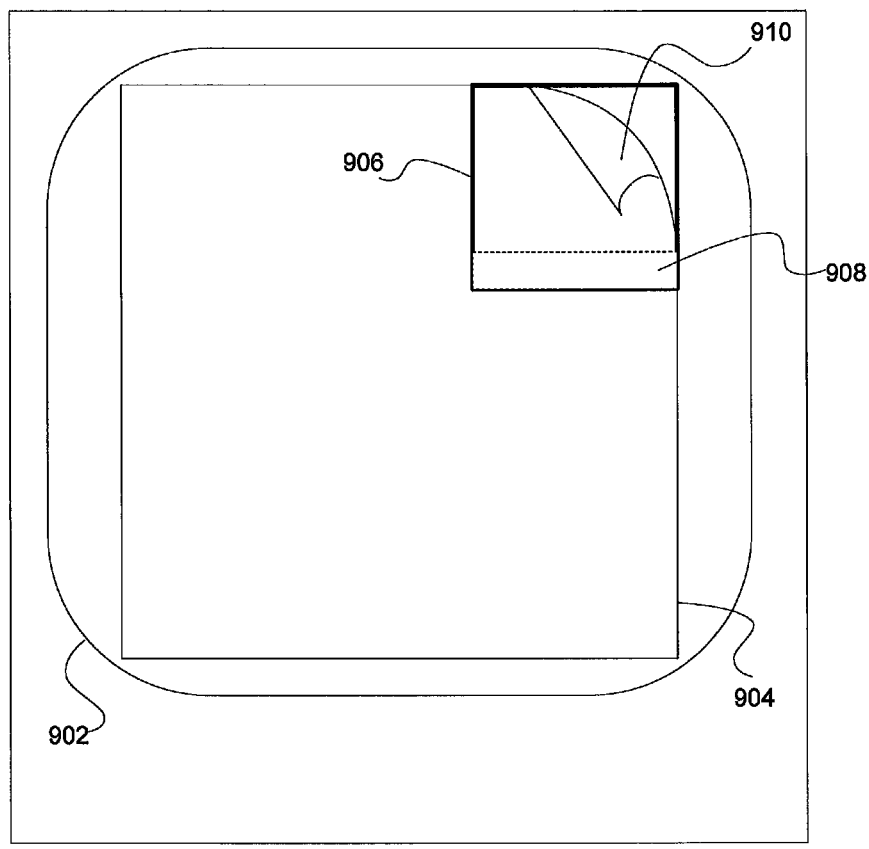
FIG. 9 depicts an electronic device according to an embodiment.
Figure 10:
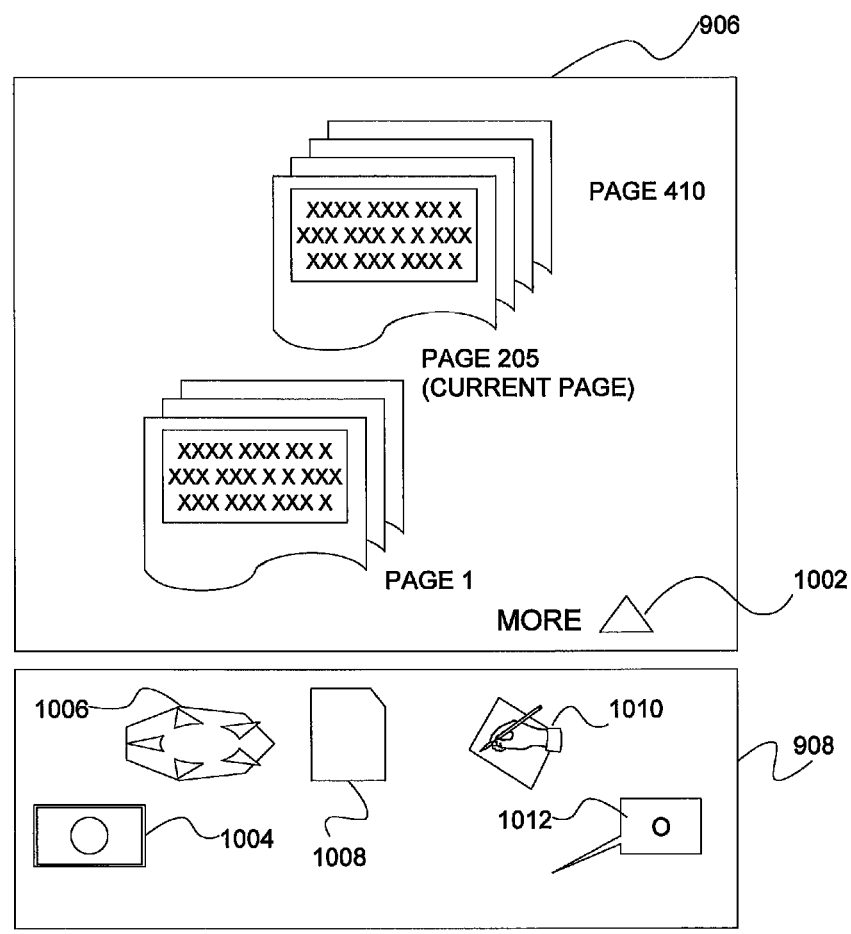
FIG. 10 depicts detailed features of the electronic device of FIG. 9 according to an embodiment.

As indicated above, the electronic devices 404 may implement a navigation user interface 412 for creating and consuming supplemental content. Turning now to FIGS. 8-10, a process for implementing the navigation user interface 412, as well as detailed features of the electronic device 404, will now be described. FIG. 9 illustrates an electronic device 900, which corresponds to any of the electronic devices 404 in FIG. 4. The processes described in FIG. 8 assume that the electronic device 900 employs a touch screen feature and that the electronic content is an e-book. The processes described in FIG. 8 also assume that existing supplemental content has been downloaded to the electronic device 900.

At step 802, the end user of an electronic device 404 opens an electronic book thereon. Once the electronic book is opened on the electronic device 900, a page 904 of the electronic book is presented on a display screen 902 of the device 900.

The electronic device 900, via the navigation user interface 412, identifies the occurrence of a navigation event at step 804. The navigation event may be initiated when the end user performs an action on the electronic device 900, such as a tactile gesture on a portion of the display screen 902. As shown in FIG. 9 for illustrative purposes, and by way of non-limiting example, the end user touches a page curl 910 of the page 904 and a navigation panel 906 is presented along with a menu panel 908.

At step 806, the navigation user interface 412 checks the memory or storage of the electronic device 900 for an identifier of the electronic book opened by the end user. The identifier of the electronic book may be an international standard book number (ISBN) or other unique identifier. If the identifier of the electronic book is present in the storage at step 808, the navigation user interface 412 retrieves objects in the memory that are associated with the identifier of the electronic book at step 810. The objects refer to instances of the supplemental content and may include portions of text, pages having graphics/diagrams, and/or pages having annotations, etc.

At step 812, object categories associated with the retrieved objects are displayed in the navigation menu panel 908. As shown in FIG. 10, pictographic icons representing each of the categories of objects are displayed. The categories shown in FIG. 10 include pictures/images 1004, diagrams/graphs 1006, full text 1008, annotations 1010 created by the end user of the electronic device 900, and annotations 1012 created by a third-party entity or the author of the electronic book. Once an object category has been selected by the end user, corresponding supplemental content, or alternatively a listing of supplemental content for the selected object categories (if more than one object exists for the selected category), is presented on the navigation panel 906 at step 814. For example, objects are shown in FIG. 10 as pages of text in the navigation panel 906. Also shown in FIG. 10 is a navigation option 1002 selectable by the end user for navigating through the supplemental content (e.g., pages) presented in the navigation panel 906.

Returning to step 808, if no identifier exists in the memory for the electronic book, this means the electronic book contains no supplemental content for the electronic book. In this instance, the navigation user interface 412 may be configured to prompt the end user via the navigation panel 906 or other location on the display screen 902 to search for supplemental content over one or more network(s) 406 at step 816.

Technical effects include content-based navigation, which provides the ability for end users of electronic devices to create and consume content that is supplemental to existing electronic content that has been downloaded to the electronic devices. The content-based navigation services provide end users with a navigation user interface that guides the end users through a process for creating supplemental content, as well as downloading supplemental content derived from other sources.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A system, comprising:
a computer processor; and
logic executable by the computer processor, the logic configured to implement a method, the method including:
receiving supplemental content to an electronic book from a plurality of user devices associated with end users having downloaded the electronic book, the supplemental content created separately from the electronic book, the supplemental content from the plurality of user devices representing collective supplemental content;
for each of the plurality of user devices, associating an identifier of the electronic book with the collective supplemental content and storing the collective supplemental content with the identifier in a storage device;
creating an index to the supplemental content that is searchable by the identifier of the electronic book for the plurality of user devices;
providing the plurality of end user devices with access to the collective supplemental content in the storage device via the index; and
in response to receiving a request from another user device to download the electronic book, transmitting the electronic book along with the collective supplemental content created by the end users and the index to the other user device;
receiving a request from one of the plurality of user devices for supplemental content associated with an electronic book;
searching memory of the one of the plurality of user devices for an identifier of an electronic book to which the request for the supplemental content corresponds; and
in response to determining that no supplemental content exists in the storage device for the electronic book subject to the request for the supplemental content, prompting the one of the plurality of user devices to search an alternative source of supplemental content.

2. The system of claim 1, further comprising logic configured for implementing:

associating an identification of a contributor of the supplemental content with the supplemental content, the contributor representing one of the plurality of user devices; and storing the identification of the contributor with the supplemental content in the storage device;

wherein the creating the index includes incorporating the identification of the contributor in the index such that the supplemental content is further searchable by the identification of the contributor.

3. The system of claim 1, wherein the supplemental content includes an annotation and a corresponding association of the annotation to a portion of the electronic book.

4. The system of claim 3, wherein the association of the annotation to a portion of the electronic book comprises a location in the electronic book.

5. The system of claim 1, wherein the supplemental content includes a designation of at least one of diagrams, images, and text selected from the electronic book.

6. The system of claim 1, wherein the electronic book is downloaded as part of a purchase of the electronic book.

7. A personal electronic device, comprising:
a computer processor, and
logic executable by the computer processor, the logic configured to implement a method, the method including:
providing a navigation user interface on the personal electronic device;
identifying, via the navigation user interface, initiation of a navigation event occurring on the personal electronic device, the personal electronic device having activated an electronic book stored in memory of the personal electronic device;
searching the memory of the personal electronic device for an identifier of the electronic book;
responsive to discovering the identifier of the electronic book in the memory:
retrieving objects in the memory associated with the identifier of the electronic book;
presenting a selectable list of object categories associated with retrieved objects; and
displaying content for a user-selected object from the list on a display of the personal electronic device;
wherein the object categories are indicative of sources of the objects, the sources including collective supplemental content created by a plurality of end users corresponding to a plurality of personal electronic devices that include the personal electronic device, the supplemental content downloaded at the personal electronic device, and wherein the displaying content includes displaying the supplemental content created by the plurality of end users;
in response to receiving a request for another electronic book from an end user at the personal electronic device, downloading the other electronic book, along with the collective supplemental content and an index both associated with the other electronic book, the supplemental content and index associated with the other electronic book created by the end users;
receiving a request from the end user at the personal electronic device for supplemental content associated with an electronic book;
searching memory of the one of the plurality of personal electronic devices for an identifier of an electronic book to which the request for the supplemental content corresponds; and
in response to determining that no supplemental content exists in the storage device for the electronic book subject to the request for the supplemental content, prompting the one of the plurality of personal electronic devices to search an alternative source of supplemental content.

8. The personal electronic device of claim 7, wherein the sources including at least one of an author of the electronic book, supplemental content created by a third-party entity, and supplemental content created by an end user of the personal electronic device.

9. The personal electronic device of claim 7, wherein the object categories are presented as pictographic icons on a navigation screen on the personal electronic device via the navigation user interface.

10. The personal electronic device of claim 7, wherein the objects include annotations to the electronic book, and at least one of a grouping of images, a grouping of diagrams, and a grouping of text originating in the electronic book.

11. The personal electronic device of claim 7, wherein the navigation event is configured for initiation as a tactile gesture performed on the display of the personal electronic device, and the identifier of the electronic book is an international standard book number assigned to the electronic book.

* * * * *